June 29, 1965     P. L. BENDER ETAL     3,192,472
ALKALI VAPOR FREQUENCY STANDARD UTILIZING OPTICAL PUMPING
Filed April 14, 1959     4 Sheets-Sheet 1

INVENTORS
Peter L. Bender
Earl C. Beaty

BY *Arthur Vinegrad*

ATTORNEY

June 29, 1965   P. L. BENDER ETAL   3,192,472
ALKALI VAPOR FREQUENCY STANDARD UTILIZING OPTICAL PUMPING
Filed April 14, 1959   4 Sheets-Sheet 2

INVENTORS
Peter L. Bender
Earl C. Beaty
BY
ATTORNEY

June 29, 1965   P. L. BENDER ETAL   3,192,472
ALKALI VAPOR FREQUENCY STANDARD UTILIZING OPTICAL PUMPING
Filed April 14, 1959   4 Sheets-Sheet 4

NATURAL RUBIDIUM EMISSION LINES

ABSORPTION LINES FOR
$Rb^{85}$ IN 5cm Hg. of ARGON

GROUND STATE HYPERFINE
SPLITTINGS

TYPICAL RUBIDIUM HYPERFINE TRANSITON LINE

INVENTORS
Peter L. Bender
Earl C. Beaty
BY David Robbins
John C. Stahl   ATTORNEYS United States Patent Office 3,192,472
Patented June 29, 1965

3,192,472
ALKALI VAPOR FREQUENCY STANDARD
UTILIZING OPTICAL PUMPING
Peter L. Bender, Takoma Park, and Earl C. Beaty, Chevy Chase, Md., assignors to the United States of America as represented by the Secretary of Commerce
Filed Apr. 14, 1959, Ser. No. 806,408
13 Claims. (Cl. 324—58.5)

This invention relates to frequency standards and stabilization systems and particularly to so-called atomic type frequency stabilization systems. The purpose of this invention is to provide simple but extremely stable reference frequency standards.

Previously suggested systems for frequency stabilization employ cesium beam frequency standards and ammonia maser oscillators. Such systems are relatively complex and expensive. The cesium beam standard requires a long beam for precise operation while the ammonia maser is extremely sensitive to changes in dimension of the resonant cavity.

Investigation into the hyperfine m.w. transition behavior of certain gases have indicated the desirability of employing such phenomena for frequency stabilization. In an article by M. Arditi, Phys. Rev. 109, 1012 (1958) for example, the effect of sodium when first radiated with a sodium light source in the presence of a homogeneous magnetic field to produce an energy state change and then subjected to microwave energy was investigated. Frequency measurements made in connection with such investigation indicated the effectiveness of sodium spectral effects for frequency standardization purposes.

As evidence by said article hyperfine absorption lines in alkali metal vapors can provide very narrow microwave absorption lines.

In accordance with known theory, an alkali atom may exist in an electronically unexcited ground state consisting of two levels. These are known as the two hyperfine sublevels of the ground state. The hyperfine state is determined by the relative orientations of the magnetic moments between the outer electrons and the nucleus of the atom. In addition, the component of the total angular momentum along the direction of the magnetic field is needed to define the particular state of the atom.

Briefly, in the referred-to Arditi article there is described a method for producing transitions between the above-mentioned hyperfine energy levels and detecting the occurrence thereof. Specifically, optical pumping is employed to cause a difference in population (atomic distribution) between the two ground state sub-levels and microwave energy is applied (to the specimen) to determine the transitions, which are detected by a photo tube. The amount of light absorbed by the atoms during optical pumping is a measure of how many are in an upper and lower level respectively. The change in light absorption as detected by the photo tube when microwave energy of the proper frequency is then applied provides a means for determining the occurrence of transition between the energy levels.

The present invention involves an improvement over the systems such as are described by Arditi in the referred-to article and specifically is directed to a method which significantly improves on the efficiency and accuracy of such systems.

In a manner constituting an extension of the method described in the Arditi article, a novel system employing different elements or isotopes comprising a class whose emission and absorption lines can readily be made to overlap with each other is used. One of the elements or isotopes is employed in a light source for optical pumping, the other element or isotope being used as an absorption cell for microwave energy. The absorption consequent to the application of microwave energy to the absorption cell results in extremely narrow absorption lines which are narrower than the normal Doppler width by a factor as much as 300 or more. The invention therefore particularly contemplates the use of emission or absorption lines of different isotopes of the same element or of different elements for frequency stabilization purpose.

In addition, in accordance with another aspect, the invention also provides a significant reduction in the line widths of the absorption and emission lines. By combining selected buffer gases with the different elements and isotopes employed in the practice of this invention, line widths narrower by a factor of 3 or 4 than those previously obtained have been produced. By comparison, a cesium beam tube giving as narrow lines would have to be about 15 feet in length.

Narrow microwave absorption lines obtained by the practice of this invention can be used to stabilize quartz crystal oscillators or other frequency sources in a manner now widely known in the art. See the Hershberger Patents Nos. 2,609,654 and 2,591,258 and Patent No. 2,849,613 issued to R. H. Dicke, for example. A measure of the accuracy to which the frequency can be controlled is given by the ratio of the voltage signal-to-noise for a given integrating time to the line width. In accordance with the principles of this invention a significant increase in the signal-to-noise ratio has been achieved.

As will be disclosed, the invention also contemplates a method of providing a reference frequency employing selected combinations of elements or isotopes with buffer gases which results in an extremely small temperature coefficient.

The above-mentioned feature and other objects of this invention will be developed in more detail in the following disclosure taken in connection with the drawings in which:

FIG. 1 diagrammatically illustrates an apparatus by which certain procedures of one form of the present invention employing different elements can be implemented;

Atoms of all elements are characterized by energy levels. There are certain sharp lines characteristic of the element at which they will absorb or emit light.

The energy corresponding to one of these spectral lines represents the change in the energy for the atom which corresponds to its making such a transition.

The spectral absorption and emission lines of elements such as rubidium and cesium exhibit hyperfine components. These hyperfinely separated spectral lines are caused by the hyperfine splitting of the ground state level.

The present invention provides a special spectral distribution of light intensity of such nature as to give more light at one hyperfine component of the resonance lines than at the other hyperfine component. In such a case, atoms of the absorption media employed, which are in one of the two ground state hyperfine sublevels, are then raised to the excited state more rapidly than atoms in the other sublevel. Since atoms fall back to both ground state levels, a net excess of population is established for the level from which atoms are excited more slowly and such effect can then readily be manifested by monitoring the amount of light transmitted through or scattered from the selected media.

For purposes of explanation, the hyperfine (optical) pumping to be described contemplates a system which uses differences in intensity of the hyperfine components of the optical lines to pump atoms out of one ground state hyperfine sublevel and into the other. Atoms from one hyperfine sublevel are raised to the excited state more frequently than those from the other, and if the transition probabilities back to the two ground state sublevels are approximately equal, a resulting difference in population of the ground state sublevels is obtained.

Figure 3:
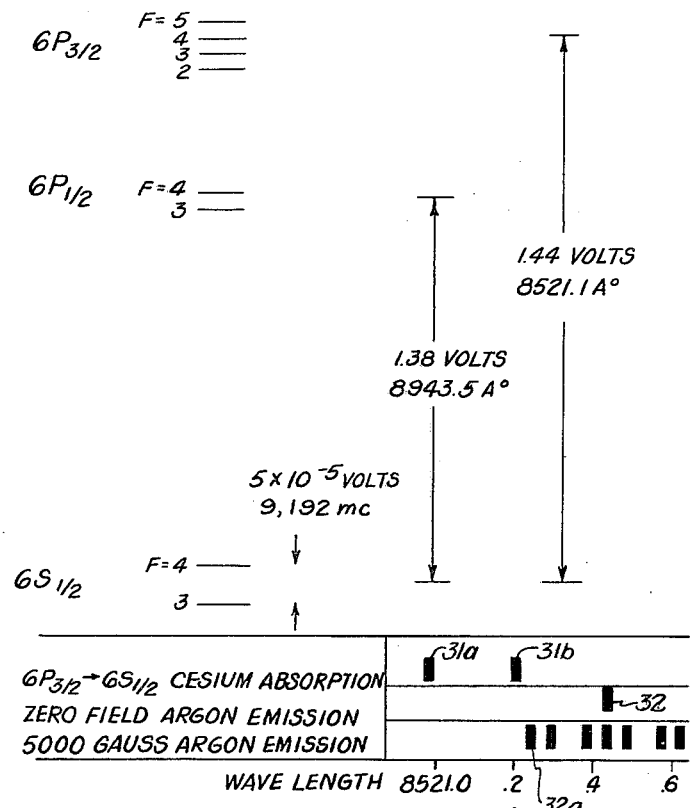
FIG. 3 is an illustrative energy level diagram.

For example, FIG. 3 illustrates an energy level diagram for cesium. The various energy levels are indicated as $6P_{3/2}$, $6P_{1/2}$, and $6S_{1/2}$ in accordance with conventional nomenclature (see pages 7–33), Handbook of Physics by Condon and Odishaw, McGraw-Hill.

The wavelengths of the relevant optical lines are given at the bottom of FIG. 3. It will be noted that the hyperfine components labeled $31a$, $31b$ of the $D_2$ line for cesium are at 8521.0 and 8521.2 A., respectively. Adjacent the latter is the line labeled 32 for argon at approximately 8521.4 A. By the application of a suitable magnetic field of approximately 5000 gauss line 32 can be split to produce a spectral distribution such that at least one of the components will overlap one cesium hyperfine component. Such component is indicated by $32a$ in FIG. 3 and it will be apparent that it overlaps the cesium hyperfine component $31b$ at 8521.2 A. Such overlapping results, in effect, in a reinforced light source which has much more intensity at the wavelength of one cesium hyperfine component (i.e. that represented by $31b$ in FIG. 3) than at the other and this makes efficient hyperfine pumping possible in accordance with the principles of the present invention.

The above explanation also particularizes the specific nature of the invention which has previously been indicated as dealing with different elements and isotopes "whose emission and absorption lines can be made to overlap with each other."

Previous experiments, such as those conducted by Arditi made use of the difference in absorption coefficient of a single gaseous element for the two optical hyperfine components. That is, the same element was used as a light source and as an absorption medium.

As above noted, the present invention is based on the use of emission or absorption lines of different isotopes or of different elements. Frequency reference lines are thereby obtained which give very large signals and extremely small widths. This makes possible an extremely stable frequency standard. A further modification of the present invention employing specially chosen buffer gases together with the absorption medium results in an extremely small temperature coefficient as will be described.

With the above preliminary explanation and objectives in mind various methods of implementing the invention will now be described.

Figure 1:
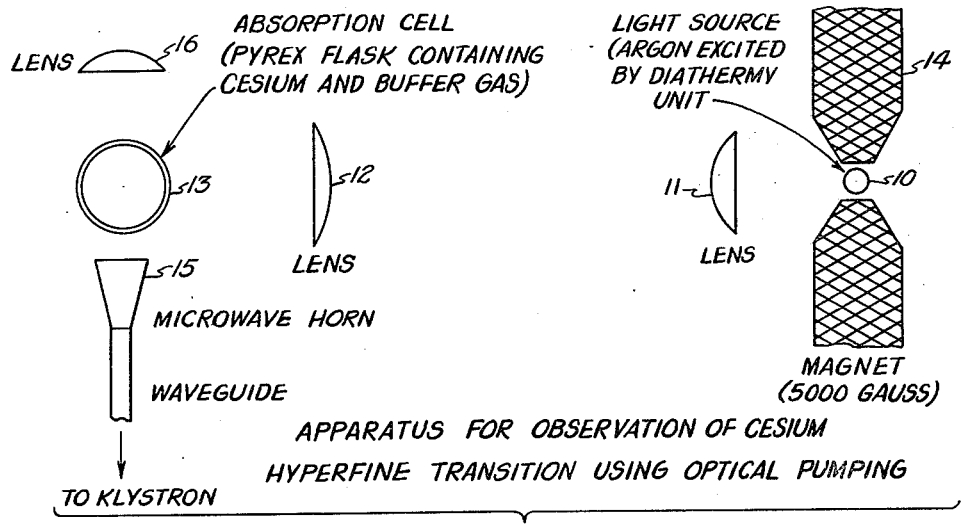

The experimental arrangement for implementing a system employing two different elements is diagrammatically shown in FIG. 1. In this figure, light from an argon light source 10 is subjected to Zeeman splitting by a suitable magnetic field exemplified by magnet 14. Such spectrally distributed light is then applied through a suitable optical system exemplified by lenses 11 and 12 to an absorption media represented by cell 13. The light source 10 corresponds to a first element such as argon, for example.

The media in the absorption cell 13 corresponds to a second element such as cesium and a buffer gas. Provision is made for radiating the material in the absorption cell 13 with microwave energy by providing a microwave horn 15 for applying microwave energy from a suitable source (not shown).

By use of a precision frequency control unit the frequency of the microwave source can be swept through the resonant frequency for cesium in very fine steps to enable accurate determination of the absorption effects. Detection of the light emission from the absorption media in cell 13 is accomplished in a conventional manner by means of a photo cell V1 and related circuitry (not shown). The photocell is optically coupled to the absorption cell through a lens system designated as 16 in FIG. 1.

The above-outlined procedure has resulted in line widths of about 40 cycles comparable to a Q of 200,000,000 with a voltage signal-to-noise ratio of about 400.

In a typical operation of the arrangement in FIG. 1, light from source 10 is subjected to Zeeman splitting so that component $32a$ of the argon emission overlaps the cesium hyperfine component $31b$, as shown in FIG. 3. As the argon light from source 10 is transmitted through lenses 11 and 12, cell 13, atoms in the $F=2$ level are raised to the excited state more frequently than those in the $F=1$ level, and since transition probabilities back to the respective levels is approximately equal, a difference in population occurs, i.e., after a period of time many of the atoms in level $F=1$ will move to level $F=2$. This will be indicated by minimum absorption and re-emission of light through lens 6 to photomultiplier VI.

In a weak magnetic field, which is always present, level $F=4$ of the ground state is split into magnetic substates which may be designated as $-4$, $-3$, $-2$, $-1$, $0$, $+1$, $+2$, $+3$, $+4$ and level $F=3$ of the ground state is split into magnetic substates which may be designated as $-3$, $-2$, $-1$, $0$, $+1$, $+2$, $+3$. This will result in a number of slightly different frequencies at which transitions between the hyperfine levels can occur, each corresponding to transitions between the different magnetic substates of levels $F=3$ and $F=4$. One of these transitions which connects magnetic substate 0 of the $F=3$ level to the magnetic substate 0 of the $F=4$ level is in the first order independent of the magnetic field and is, therefore, more useful for frequency control purposes than any of the other transition frequencies.

Figure 4:
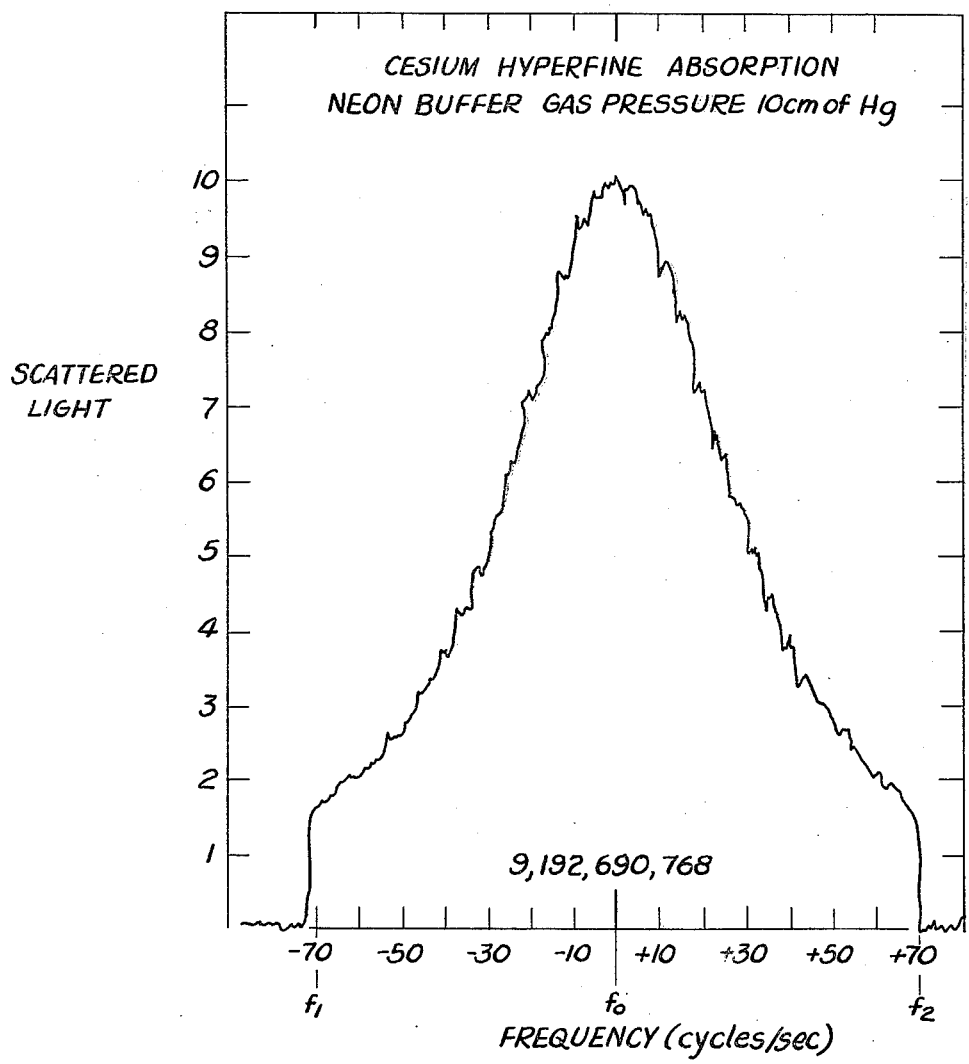
FIG. 4 represents the intensity of scattered light from a cesium cell as a function of applied microwave frequency in the presence of a neon buffer gas.

If the microwave source (not shown) whose output is applied through horn 15 to cell 23 is swept in very fine steps through a range of frequencies from $f_1$ to $f_2$ in FIG. 4, atoms will move from the magnetic substates of the $F=3$ level to the magnetic substates of the $F=4$ level, increasing the absorption and re-emission of light. As the source approaches reference frequency $f_0$, the absorption and re-emission of light increases until a maximum is reached when the microwave source is precisely set at the desired reference frequency, which in this case will correspond to the transition frequency between magnetic substate 0 of the $F=3$ level and magnetic substate 0 of the $F=4$ level.

Figure 8:
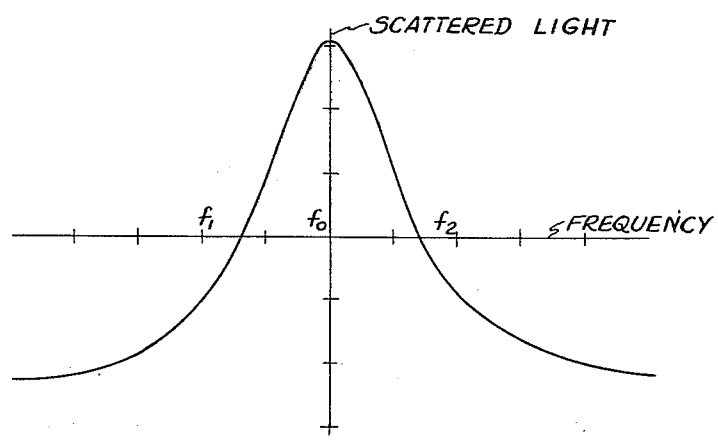
FIG. 8 represents the change in scattered light for a rubidium sample with applied microwave frequency for a typical hyperfine line.

The buffer gases employed in connection with the procedure described in connection with FIG. 1 together with the resulting shift in frequency $f_0$, shown in FIGS. 4 and 8; in c.p.s. per cm. of buffer gas pressure are indicated in Table I.

Table I

| Buffer gas | Frequency shift in c.p.s. per mm. of buffer gas pressure | Temperature shift in c.p.s. per deg. centigrade per mm. of buffer gas pressure |
|---|---|---|
| Helium | +1,050 | +15 |
| Nitrogen | +890 | |
| Neon | +580 | +1 |
| Argon | −190 | −7 |
| Krypton | −1,300 | |
| 75% Argon 25% Neon | Very small shift at room temperature but residual shift is temperature dependent. | |

It will be noted that the use of neon as a buffer gas in the absorption cell 13 is quite significant in reducing the temperature coefficient since it results in only a +1 c.p.s. shift.

Line width measurements conducted in accordance with the procedure of the above example gave considerably narrower lines for neon and helium than for argon. With neon, the width at half power was 40 cycles at 1 cm. to 10 cm. pressure of buffer gas and about twice this width at 3 mm. and 50 cm. of buffer gas with much weaker signals.

For helium, 40 cycle line widths were found at buffer gas pressures of 1 and 3 cm.

For neon, the calculated reduced Doppler width at 3 mm. pressure was about 50 cycles. The line width for argon, however, is about 120 cycles at 1 cm. and 4 cm. pressure, and then starts to increase at a buffer gas pressure of 15 cm.

A specific example of the use of emission and absorption lines of different elements for frequency stabilization has been given. As previously indicated, the present invention also contemplates the use of such phenomena in connection with different isotopes.

Figure 2:
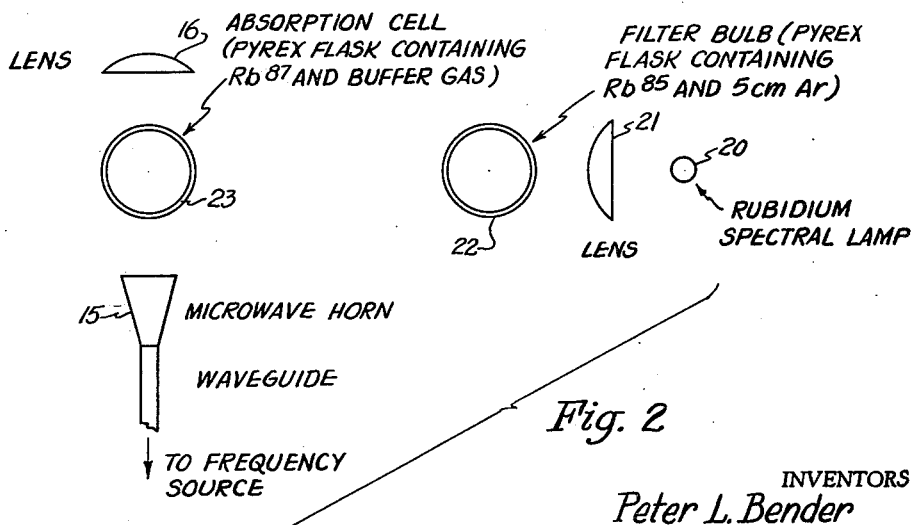
FIG. 2 shows a modified apparatus for carrying out a modified method of the present invention employing different isotopes.
Figure 7:
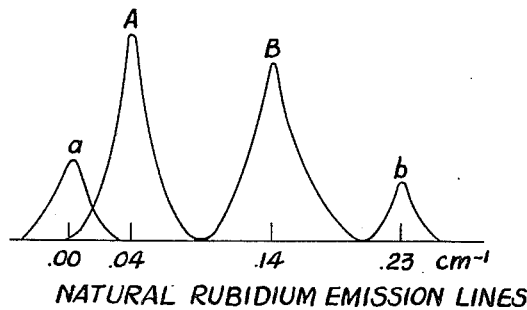
FIG. 7 represents the natural rubidium emission lines.
Figure 6:
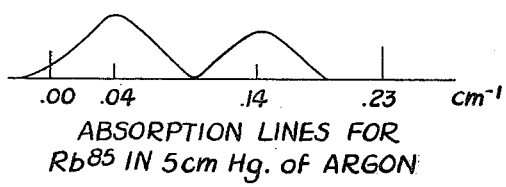
FIG. 6 represents the absorption lines for $Rb^{85}$ in 5 cm. hg. of argon.

In FIG. 2, a filter 22 containing $Rb^{85}$ mixed with a buffer such as argon at 5 cm. pressure is employed as a filter. The light from source 20 having the emission lines shown in FIG. 7 is then focused through an optical system represented by lens 21 through the filter 22 and on to an absorption cell 23 containing rubidium 87 and a buffer gas. The $Rb^{85}$ comprising filter 22 will absorb one hyperfine component for $Rb^{87}$ more strongly than the other hyperfine component. Compare FIGS. 6 and 7. Therefore the effect on the $Rb^{87}$ media in absorption cell 23 is to pump atoms out of the lower ground state sublevel into the upper of the two ground state sublevels. The $Rb^{87}$ specimen in absorption cell 23 is radiated with microwave energy by means of a microwave horn 15 and a stable power source. Detection of the absorption lines is then obtained by means of a photo cell V1.

As is well known, the strongest lines emitted by the source represented by rubidium lamp 20 are the two resonance lines at 7800 and 7947 A. These lines are absorbed by the $Rb^{85}$ vapor in the filter 22 and in the absorption cell 23 and cause transitions to the $5^2P_{3/2}$ and $5^2P_{1/2}$ excited states. The hyperfine components of the $Rb^{85}$ lines are separated by only half as much as the $Rb^{87}$ hyperfine components and have a slightly different mean wavelength. When a buffer comprising argon at 5 cm. pressure is added to the filter 22, the $Rb^{85}$ absorption lines are somewhat broadened. The lower energy hyperfine component of the $Rb^{87}$ lines from the lamp 20 are then absorbed considerably more strongly in filter 22 than the higher energy ones. The light reaching the absorption cell thus causes transitions mainly from a lower ground state hyperfine level to an excited state and since the atoms return by spontaneous emission to both ground state levels, they tend to accumulate in the higher level.

Since the intensities of the hyperfine components are not equal, the intensity of the light scattered by the $Rb^{87}$ in absorption cell 23 will depend on the populations of the two levels and thus provide a means for monitoring the relative populations. When an oscillating magnetic field represented by the microwave energy from horn 15 having the right frequency to cause the ($F=2$, $M_F=0$) ($F=1$, $M_F=0$), hyperfine transition is applied to the sample, the population difference between the two hyperfine levels decreases and the intensity of the scattered light reaching the photomultiplier VI increases.

Figure 5:
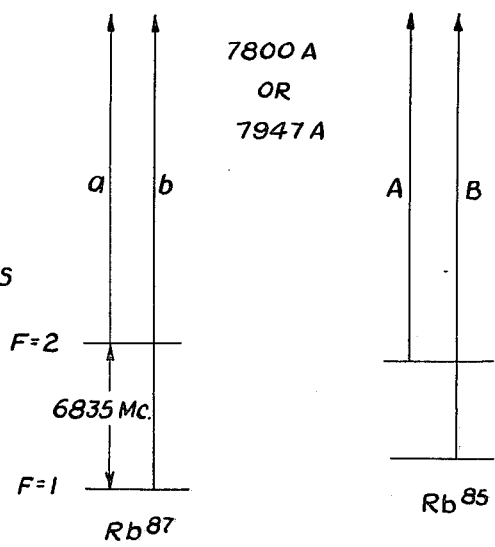
FIG. 5 represents the ground state hyperfine splittings of $Rb^{85}$ and $Rb^{87}$.

In a typical operation of the embodiment in FIG. 2, the emission lines of source 20, shown in FIG. 7, are focused on filter 22 where all of the lines except component $b$ are substantially absorbed. Thus, the light reaching cell 23 consists primarily of hyperfine component $b$. Atoms in the $F=1$ level in FIG. 5 are therefore preferentially raised to excited state. Since atoms returned by spontaneous emission to both level $F=1$ and $F=2$ with similar rates an excess population in the $F=2$ level is produced. Because of the difference in population between the $F=1$ and $F=2$ levels, the optical absorption coefficient for the $F=1$ level decreases since fewer atoms are in the state where they can absorb component $b$. This will be indicated by minimum absorption and re-emission of light through lens 16 to photomultiplier VI.

In a weak magnetic field, which is always present, level $F=2$ of component $b$ is split into magnetic substates which may be designated as $-2$, $-1$, 0, $+1$, $+2$ and the $F=1$ level of component $b$ is split into magnetic substates which may be designated as $-1$, 0, $+1$. This results in a number of slightly different frequencies at which transitions between hyperfine levels can occur, each corresponding to transitions between different magnetic substates of the two levels. One of these which connects the magnetic substate 0 of the $F=1$ level to the magnetic substate 0 of the $F=2$ level is in the first order independent of the magnetic field and is, therefore, much more useful for frequency control purposes than any of the other frequency transitions.

The equilibrium level populations will be dependent upon the rate of photo absorption and the rate at which atoms can return from the $F=2$ to the $F=1$ level by relaxation or by some other means. If the microwave source, not shown, whose output is applied through horn 15 to cell 23 is swept in very fine steps through a range of frequency from $f_1$ to $f_2$ in FIG. 8 atoms will move from the $F=2$ to $F=1$ level increasing the absorption and re-emission of light. As the source approaches reference frequency $f_0$, the absorption and re-emitted light increases until a maximum is reached when the source is set precisely at the reference frequency, which in this case will correspond to the transition frequency between magnetic state 0 of the $F=1$ level and magnetic substate 0 of the $F=2$ level.

In another embodiment, filter 22 in FIG. 2 is eliminated and light source 20 is modified to contain primarily $Rb^{85}$. The light emitted from source 20, focused on cell 23 by lens 21, is absorbed by the atoms which are in the upper of the two ground state levels so that the operation of this embodiment is essentially the same as described immediately above in connection with FIG. 2.

With the hyperfine pumping method described above measurements have been made of the resonance frequencies, line widths, and signal strengths for a number of absorption cells containing various buffer gases. Most of the cells used were 500-ml. Pyrex flasks which were thoroughly outgassed before filling. About 3 mg. of $Rb^{87}$ was distilled into each cell, and then the desired buffer gas was introduced and the cell sealed off. Rubidium vapor pressure of about $2 \times 10^{-7}$ mm. at room temperature gave an absorption coefficient of about unity for the cells with fairly low buffer gas pressures. The inert gases and mixtures used (specifically enumerated in Table II to be discussed) were of spectroscopic grade, while the other gases indicated in Table II came from sources of relatively high purity. An accelerated aging test gave no indication of a frequency shift for a cell held at 200° C. for one week.

In Table II the observed pressure and temperature shifts measured near room temperature are given.

*Table II*

| Buffer gas | Frequency shift in c.p.s. per cm. of buffer gas pressure | Temperature shift in c.p.s. per deg. centigrade per cm. of buffer gas pressure |
|---|---|---|
| Hydrogen | +6,600±130 | +10 |
| Deuterium | +6,700±150 | +10 |
| Helium | +7,200±140 | +10 |
| Neon | +3,920±50 | +2.6 |
| Nitrogen | +5,200±100 | +6 |
| Argon | −510±10 | −3.0 |
| Krypton | −5,800±500 | −5 |
| Methane | −5,000 | −6 |
| n-Pentane | −28,000 | −7 |
| Neopentane | −29,000 | +2 |
| n-Heptane | −42,000 | +2 |
| Mixture I (11.7% Ne +88.3% A) | +14±3 | −2.4 |
| Mixture II (50% Ne +50% A) | +1,700±40 | −0.2 |

Table II shows the changes in the hyperfine transition frequency for $Rb^{87}$ absorption cells as a function of the pressure of the buffer gas employed and the temperature of the cell. The pressure coefficients were measured at constant temperature and the temperature coefficients at constant volume. The temperature shifts are the observed shifts in frequency for a given change in temperature of the entire cell 22, and thus are not measured at constant pressure.

It is clear that, as was observed for cesium, the pressure and temperature shifts are not simply related. However, the results given for the two mixtures demonstrate that it is possible to reduce greatly either the pressure or the temperature coefficient by choosing the proper composition. By using three gases together, such as neon, argon, and one of the hydrocarbons, it is possible to reduce strongly both the pressure and temperature dependence. The accuracy of most of the pressure shifts given is limited almost entirely by uncertainties in the measurement of the buffer gas pressures. The observed shifts are linear with pressure and extrapolate to the same zero-pressure frequency within the uncertainties in the measurements.

Line width and signal strength measurements were made with the light intensity and microwave power at levels which contributed little to the widths of the narrowest lines observed. The line width as a function of pressure gave a very broad minimum at several cm. pressure for most of the buffer gases used. For pressures above the minimum, the signal strength at room temperature went down quite rapidly, while the line width went up slowly. For neon and helium the line widths at 20 cm. were about 25 and 40 c.p.s., respectively.

The narrowest lines were obtained using neon and helium at pressures of several cm. The signal strength corresponded to a 5% change in the amount of light scattered from the $Rb^{87}$ vapor. The line width was about 20 cycles, giving a Q of over 300 million.

Somewhat narrower lines have been obtained for the $Rb^{87}$ ground state Zeeman transitions in the earth's magnetic field. These are the field dependent $$\Delta F=0, \Delta M=\pm 1$$

transitions.

To minimize stray field disturbances the above experimental procedure was conducted at the Fredericksburg Magnetic Observatory in Fredericksburg, Virginia. The method introduced by Dehmelt of transmission monitoring with circularly polarized light as described in Phys. Rev. 105, 1487 (1957) and Phys. Rev. 107, 1559 (1957) was used.

Line widths at half power of less than 20 cycles were observed for rubidium and cesium at pressures of a few cm. of argon or neon. For rubidium 87 it was possible to resolve the second order splittings which are about 46 cycles in the earth's field, although the 2→1 transition was much stronger than the others.

Measurements of line widths at higher buffer gas pressures gave results consistent with those obtained for the hyperfine transition. In particular, for cesium a collisional contribution to the line width of about 4 cycles/cm. at half voltage for argon and a factor 3 or so less for neon was found. Measurements of the signal decay time after reversing the magnetic field, as described by Dehmelt in the above article, were also carried out for cesium in argon, and the measured time was found to be about a factor 5 longer than would correspond to the observed line widths. This indicates that the most important transitions in the relaxation process are ones for which the change in M is small.

For argon the best lines were about 30 c.p.s. wide. Strong and narrow lines were also obtained for some of the hydrocarbons at pressures of several mm.

For most of the measurements, the applied frequency from the RF power source was sinusoidally swept at 4 c.p.s. between the points of maximum and minimum slope of the line, and the photomultiplier output was displayed with a 30-c.p.s. bandwidth on an oscilloscope. Although the frequency could be set on the center of the hyperfine absorption line to 5 parts in $10^{11}$, the over-all accuracy of the frequency measurements was not quite this high because of random minute-to-minute variations of 1 or 2 parts in $10^{10}$ in the frequency source.

For mixture I listed in Table II a fairly good extrapolation to zero pressure could be made. The accuracy was limited to about 1 part in $10^9$ by a scatter of several c.p.s. in the points obtained with different absorption cells. A set of 100-ml. absorption cells was also used in this extrapolation to eliminate the possibility of a size effect. The frequency obtained was 6 834 682 608±7 c.p.s. with respect to the A.1 time scale introduced by Markowitz on which the $Cs^{133}$ frequency is 9 1 92 631 770 c.p.s.

It will be apparent that the embodiments shown are only exemplary and that various modifications can be made in construction and arrangement within the scope of invention as defined in the appended claims.

What is claimed is:

1. In a frequency stabilization system, an improved system for providing an extremely stable precision reference frequency comprising means for irradiating a first nuclear species with light from a source providing substantial intensity at only one hyperfine component of the optical absorption lines in said first nuclear species, means for detecting the occurrence of hyperfine transitions in said first nuclear species which are to the first order independent of a magnetic field, said detecting means comprising means for radiating said first nuclear species with microwave energy and means for monitoring the light absorbed by or scattered by said first nuclear species.

2. The invention of claim 1 in which said light source comprises components from the discharge of a second nuclear species, said first and second nuclear species being selected from a class of nuclear species the respective absorption and emission lines of which can be made to overlap to permit optical pumping.

3. The invention of claim 2 in which said first and second nuclear species are different elements respectively.

4. The invention of claim 3 in which said first element is cesium and said second element is argon and including magnetic field means for producing Zeeman splitting of the light from said argon source.

5. The invention of claim 2 in which said first and second nuclear species respectively are different isotopes of the same element.

6. The invention of claim 5 in which said first isotope is $Rb^{87}$ and said second isotope is $Rb^{85}$.

7. The method for reducing the temperature sensitivity of the resonant frequency of a nuclear species in a container having a selected volume comprising the steps of selecting at least one first buffer gas having a negative temperature coefficient, selecting at least one second buffer gas having a positive temperature coefficient, determining the relative partial pressure of said first and second buffer gas to provide a mixture having a substantially zero temperature coefficient, and placing the mixture of said first and second buffer gas in said container.

8. The method in claim 7 wherein said first and second buffer gas are each selected from the group consisting of hydrogen, nitrogen, the inert gases and volatile hydrocarbons.

9. A method for providing a precision reference frequency comprising the steps of placing a nuclear species in a container having a selected volume, selecting at least one first buffer gas having a negative temperature coefficient, selecting at least one second buffer gas having a positive temperature coefficient, determining the relative partial pressure of said first and second buffer gas to provide a mixture having a substantially zero temperature coefficient, placing said mixture in the container, radiating said nuclear species with light having substantial intensity at only one hyperfine component of the optical absorption lines in said nuclear species, radiating said nuclear species with electromagnetic energy, and monitoring the light absorbed and re-emitted by said first nuclear species.

10. The method in claim 7 wherein said first buffer gas is selected from the group consisting of argon, krypton, methane, and n-pentane and said second buffer gas is selected from the group consisting of hydrogen, deuterium, helium, neon, nitrogen, neopentane, and n-heptane.

11. In a system for detecting hyperfine transitions in a first nuclear species, a light source including a second nuclear species, said source being positioned to irradiate said first nuclear species, said first and second nuclear species being different members of a class of species the respective absorption and emission lines of which can be made to overlap to permit optical pumping, means for radiating said first species with electromagnetic energy, and means for monitoring the light absorbed or scattered by said first nuclear species.

12. In a system for detecting hyperfine transitions in a first nuclear species, a filter comprising a second nuclear species, said first and second nuclear species being different members of a class of species the respective absorption and emission lines of which can be made to overlap to permit optical pumping, a light source comprising at least one nuclear species, said filter being positioned between said first nuclear species and said light source, means for radiating said first species with electromagnetic energy, and means for monitoring the light absorbed or scattered by said first nuclear species.

13. The invention in claim 12 in which said first nuclear species is $Rb^{87}$ and said second nuclear species is $Rb^{85}$.

References Cited by the Examiner

UNITED STATES PATENTS

| | | | |
|---|---|---|---|
| 2,836,722 | 5/58 | Dicke et al. | 331—3 |
| 2,884,524 | 4/59 | Dicke | 331—94 |
| 2,951,992 | 9/60 | Arditi | 331—3 |
| 2,955,262 | 10/60 | Arditi | 331—3 |

OTHER REFERENCES

"Realization and Measurement of Long Free Atoms Spin State Lifetimes," article in Proceedings 12th Annual Symposium on Frequency Control, May 6–8, 1958, A. G. Dehmelt, Univ. of Washington, pp. 577–592.

"Optically Detected Field Independent Transition in Sodium Vapor," article in Physical Review(I), vol. 109, No. 1, January 1, 1958, page 219.

"Optical Detection of Magnetic Resonance in Alkali Metal Vapor," article in Physical Review(II), vol. 107, No. 6, Sept. 15, 1957, pp. 1559–1565.

"A Gas Cell Atomic Clock Using Optical Pumping and Optical Detection," article by M. Arditi et al. in I.R.E. National Convention Record, vol. 6, 1958, pp. 3–9.

Journal of the Optical Society of America, June 1957, vol. 47, No. 6, "Optical Methods of Atomic Orientation and of Magnetic Resonance," by Kastler (pp. 460–465).

WALTER L. CARLSON, *Primary Examiner.*

GEORGE N. WESTBY, HERMAN K. SAALBACH,
*Examiners.*